Patented Apr. 25, 1933

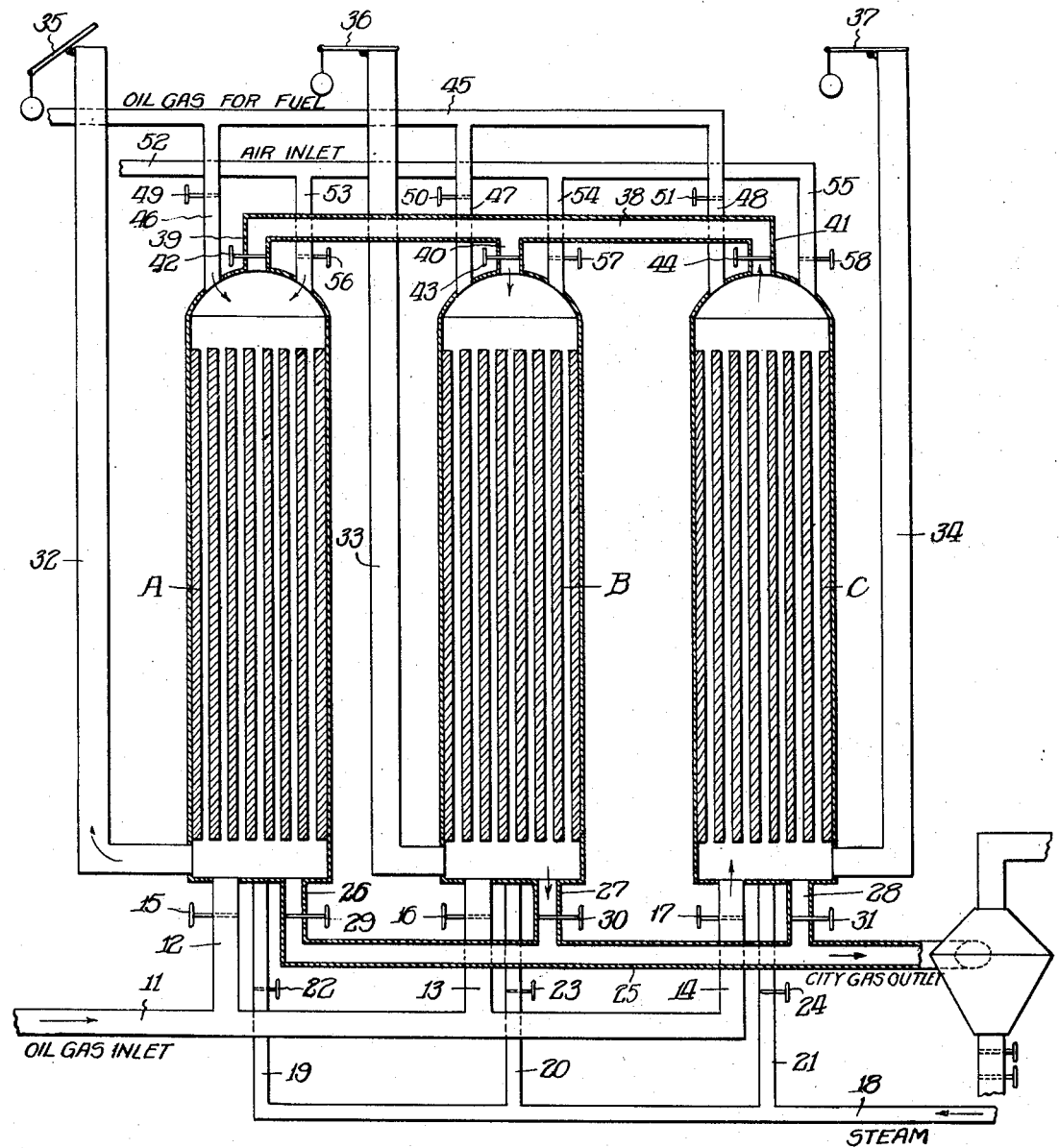

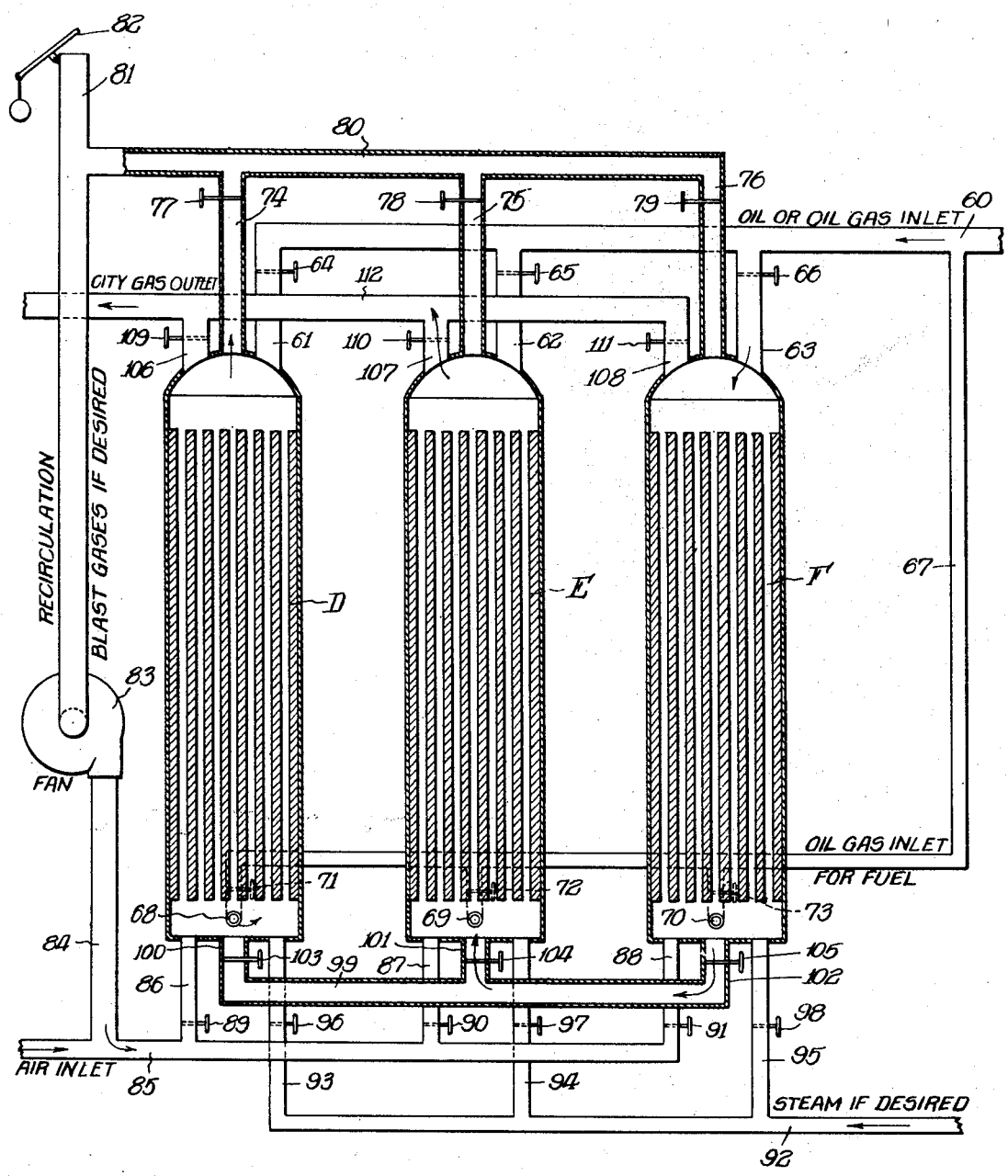

1,905,028

UNITED STATES PATENT OFFICE

CHARLES W. ANDREWS AND ARTHUR J. BOYNTON, OF CHICAGO, ILLINOIS, ASSIGNORS TO H. A. BRASSERT & COMPANY, OF CHICAGO, ILLINOIS, A CORPORATION OF ILLINOIS

TREATMENT OF OIL GAS

Application filed October 8, 1928. Serial No. 311,003.

This invention relates to a new and improved method of treating oil gas or the like, and more particularly to methods of reducing the specific gravity and the B. t. u. value of such gas to points rendering it suitable for use in connection with regular city gas supplies.

In plants for the treatment of crude oils and the like by distillation or cracking processes, there is a considerable surplus of oil gas of high specific gravity and B. t. u. value, as these processes, in liberating the lighter fractions, also generate large quantities of the lightest fractions in the form of fixed gases. These gases are high in heat value and are generated in excess of the quantity which can be economically utilized in the oil treatment plant itself. They are much higher both in B. t. u. value and specific gravity than the usual gas provided in supplying city gas mains. City gas supplies must be kept within rather narrow limits as to B. t. u. value and specific gravity for proper use of the various appliances connected up for use with such gas and for commercial sale and distribution of such gas. It is not, therefore, possible to sell and use the oil gas in connection with city gas supply in the conditions in which it is produced. Various methods for treating such gas have been proposed, but they have proven uneconomical in use as they have required high proportions of the heat value of the gas for use in the treatment process.

It is an object of the present invention to provide new and improved processes for the treatment of oil gas or the like, whereby the B. t. u. value and specific gravity of the gas may both be reduced.

It is a further object to provide a method of this character wherein a relatively small portion of the gas is required for providing the heat necessary for the process and in which sensible heat is recovered from the treated gas.

It is also an object to provide a method whereby the released carbon may be largely carried from the treatment apparatus and recovered for use or sale.

It is an additional object to provide a method adapted for use on a commercial scale in comparatively simple apparatus.

Other and further objects will appear as the description proceeds.

We have shown somewhat diagrammatically in the accompanying drawings certain preferred forms of construction adapted for carrying out our improved method. In the drawings—

Figure 1 is an elevation, partly in section, of one form of apparatus; and

Figure 2 is a similar view of a somewhat modified form of apparatus.

Referring first to the form of construction shown in Figure 1, three stoves A, B and C are provided. These stoves contain a heat absorbing structure adapted to receive heat in certain portions of the cycle of operation, and to give up heat in other portions of the cycle. The specific construction of the stoves forms no part of the present invention; they may be constructed in any desired manner, comprising a usual metal shell, together with an inner structure consisting of brick having vertical flues therethrough. The main 11, for the introduction of oil gas, is connected to the bottom of the three stoves A, B and C by the passages 12, 13 and 14, which are controlled by the valves 15, 16 and 17, respectively. The pipe 18, for the introduction of steam, is connected to the bottom of the three stoves by the pipes 19, 20 and 21, controlled by the valves 22, 23 and 24, respectively. The passage 25, for withdrawing the treated gas, is connected to the bottom of the three stoves by the passages 26, 27 and 28, controlled by the valves 29, 30 and 31, respectively.

The three stoves are shown as each provided with a stack, these stacks being designated 32, 33 and 34, and being controlled by the usual stack valves 35, 36 and 37. The upper ends of the stoves are connected by a cross passage 38, which leads into the three stoves by the passages 39, 40 and 41, controlled by valves 42, 43 and 44. The passage 45, which is used for introducing oil gas for fuel, is connected to the three stoves by passages 46, 47 and 48, controlled by valves 49, 50 and 51, respectively. The air inlet passage 52 communicates with the three stoves through the passages 53, 54 and 55, controlled by valves 56, 57 and 58.

Referring now to the form of construction shown in Figure 2, three stoves D, E and F are provided, these stoves being similar in purpose to the stoves already described in connection with Figure 1. The passage 60 serves for the introduction of oil or oil gas and is connected to the stoves D, E and F by passages 61, 62 and 63, controlled by valves 64, 65 and 66. The branch line 67 leads from the passage 60 and is connected through passages 68, 69 and 70, controlled by valves 71, 72 and 73, with the lower ends of the three stoves.

The off-take passages 74, 75 and 76, controlled by valves 77, 78 and 79, lead to the off-take header 80, which connects to the stack 81, controlled by stack valve 82. The stack 81 is connected at its lower end to a hot fan 83, which may force exhaust gases through passage 84 to the air inlet passage 85. The air inlet passage 85 communicates with the bottom of the three stoves by means of the branch passages 86, 87 and 88 controlled by valves 89, 90 and 91. The steam pipe 92 communicates with the bottom of the three stoves through pipes 93, 94 and 95, controlled by valves 96, 97 and 98. The cross connecting header 99 communicates with the three stoves through passages 100, 101 and 102, controlled by valves 103, 104 and 105. The gas outlet passages 106, 107 and 108, controlled by valves 109, 110 and 111, connect to the gas off-take header 112.

In the operation of the apparatus according to our method, using the form of apparatus shown in Figure 1, the stove C will have been previously heated to a temperature sufficient to break down the heavier constituents of the gas being treated such as the illuminants and to some extent the ethane to the extent desired. These heavier hydrocarbons are reduced largely to methane and hydrogen. The oil gas being treated is then introduced into the stove C through passages 11 and 14, the valve 17 being opened and the valves 15 and 16 being closed. The gas passes up through the stove C where the heat in the checkerwork serves to break down the heavier constituents of the gas and the treated gas passes off at the upper end of the stove. This gas passes off through passage 41, the valve 44 being opened, and over into the top of stove B, the valve 43 being opened. The valve 42 will be closed during this part of the cycle of operation. The treated gas passes downwardly through the stove B, giving up much of its sensible heat in this stove, and passes out through the passages 27, the valve 30 being opened. It will be understood that the valves 29 and 31 are closed at this time.

While this action is taking place in stoves B and C, the stove A is being heated. During this heating period, the stove A is closed off from the gas lines at the bottom and the valve 42 closes the connection at the top to the other stoves. The valve 56 is opened to admit air for combustion from passage 53 and the valve 49 is opened to permit the introduction of gas for fuel through passage 46. The air and gas mix in the stove and burn therein, the flame and products of combustion passing downwardly through the stove. The waste products pass out through the stock 32, the stack valve 35 being opened. It will be understood that during this heating operation any carbon previously deposited in the stove will be burnt with the gas. While the products of combustion will be shown as going directly through a stack, it will be understood that they may be passed through any desired additional heat recovery apparatus.

When the temperature of the stove C has been reduced below that suitable for carrying out the desired treatment of the gas, the process is stopped and the cycle of operation changed. During the next step in the cycle of operation, the gas will be heated and treated in stove A and will then pass to stove C where it will give up much of its sensible heat. During this portion of the operation, the valve 15 will be opened to admit the gas to the stove A and the valves 42 and 44 opened and valve 43 closed so that the treated gas may pass from stove A to stove C. During this portion of the operation the stove B will be heated by combustion. The gaseous fuel will enter through passage 47 controlled by valve 50 and the air for combustion through passage 54 controlled by valve 57. The products of combustion will pass out through stack 33, the valve 36 being opened.

In the third step in the cycle of operation, the gas will be treated in stove B and will pass through stove A to give up sensible heat therein. During the period in which gas is being treated in any one of the stoves steam may be introduced into that stove from pipe 18 through the proper connecting pipe 19, 20 and 21. This steam will be disassociated in the stove and will form water gas, mixing with the treated oil gas.

In the operation of the form of apparatus shown in Figure 2, carrying out our improved method, it will first be assumed that stove F has been raised to a temperature suitable for carrying on the desired breaking down of the gas. The gas will be introduced through passage 63, the valve 66 being opened. The gas will pass down through the hot stove and out the bottom through valve 105 and up into the bottom of stove E through valve 104. In the stove E, the gas will give up sensible heat and will pass out through the gas main 112 through valve 110. Suitable temperatures for the first stove will be slightly below 1800° F. since methane itself is broken down between 1800° F. and 2000° F. It is the intention to break down the heavier hydrocarbon gases which are commonly known as illuminants and also ethane, into gas containing such amounts of hydrogen and methane as to give with the small amount of ethane and illuminants which will remain, a B. t. u. value of about 550 per cubic foot to meet certain requirements. As the gas will leave the first stove at about this temperature, it is introduced into the second stove, the top of which will have about this temperature and the bottom a temperature between approximately 300° F. to 500° F. Temperatures will, of course, vary at different times during a run, depending on the length of cycle used.

During this period the checkerwork in stove D will be heated by combustion therein. The necessary gas for combustion will be introduced through passage 68, the valve 71 being opened. The products of combustion will pass out the top of the stove through valve 77 to the header 80 and stack 81. Regulation of the temperature in the stove may be had by recirculating the portion of the products of combustion. This is accomplished by means of the fan 83 which will draw products of combustion from the stack and pass them to mingle with the incoming air. By control of this character, the heat of the stove may be rendered more uniform throughout its height and also the rapidity of heating may be controlled so as to bring it to the proper temperature within the same period of time as that in which the stove which serves to treat the gas has been reduced below the proper operating temperature.

The further cycle of operation of the form of construction shown in Figure 2 is identical with that of the construction shown in Figure 1. Each stove serves in turn: first, to re-form or treat the gas; second, to recover heat from the re-formed gas; and third, to have additional heat supplied by the combustion of gas therein.

The stoves may be operated with such a velocity of gas flow therein as to carry off with the gas substantially all of the carbon released during the breaking down of the heavier constituents of the gas. There will be, however, some deposit of carbon and this will be burnt with the gaseous fuel during the heating portion of the cycle. The amount of deposited carbon may be controlled by varying the velocity of the gas flow through the stoves. Any desired means may be provided for recovering the carbon from the gas which passes from the stoves. One method of recovery is by means of a vortex dust collector (not shown) to which the mains 25 and 112 may be led. These vortex dust collectors may discharge the gas to wash boxes (not shown) of usual type after removal of the entrained carbon. This carbon is of such a purity as to have many commercial uses, such as, for example the making of electrodes.

While we have illustrated certain preferred embodiments of apparatus adapted for carrying out our improved methods and have described certain ways for carrying out the methods, the methods may be further varied and carried out in other forms of apparatus, and we contemplate such changes and modifications as come within the spirit and scope of the appended claim.

We claim:

The method of reducing the specific gravity of gas, which comprises passing the gas through a plurality of stoves, the first stove being at such a temperature that heavier constituents of the gas are cracked therein, the second stove being at a lower temperature and absorbing heat from the treated gases passing therethrough, simultaneously heating a third stove to a temperature suitable for cracking the heavier constituents of the gas, by combustion of a portion of untreated gases therein, controlling the temperature by recirculation of a selected portion of combustion products, and periodically varying the operation so that in the complete cycle each of the three stoves is in turn first heated by combustion, second used to treat the gas, and third heated by passing the hot treated gas therethrough.

Signed at Chicago, Illinois, this 5th day of October, 1928.

CHARLES W. ANDREWS.

Signed at Chicago, Illinois, this 4th day of October, 1928.

ARTHUR J. BOYNTON.